United States Patent
Kang et al.

(10) Patent No.: US 7,621,982 B2
(45) Date of Patent: Nov. 24, 2009

(54) LIQUID-GAS SEPARATOR FOR DIRECT LIQUID FEED FUEL CELL

(75) Inventors: Sang-kyun Kang, Seoul (KR);
Xiaobing Luo, Yongin-si (KR);
Dong-kee Sohn, Seoul (KR);
Hae-kyoung Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 595 days.

(21) Appl. No.: 11/445,337

(22) Filed: Jun. 2, 2006

(65) Prior Publication Data

US 2006/0288870 A1    Dec. 28, 2006

(30) Foreign Application Priority Data

Jun. 24, 2005    (KR) .................. 10-2005-0055115

(51) Int. Cl.
*B01D 53/22* (2006.01)
(52) U.S. Cl. .................. 96/4; 96/6; 96/7; 96/11; 96/14; 96/155; 95/45; 95/46; 95/50; 95/52; 95/241; 210/321.64; 210/321.84; 210/436; 210/640; 210/641; 429/19; 429/34; 55/478; 55/481
(58) Field of Classification Search ............ 96/4, 96/6, 7, 11, 13, 14, 155; 95/45, 46, 50, 52, 95/241; 210/321.6, 321.64, 321.84, 436, 210/640, 641; 429/19, 34; 55/478, 481
See application file for complete search history.

(56) References Cited

U.S. PATENT DOCUMENTS

| | | | | |
|---|---|---|---|---|
| 4,399,235 A | * | 8/1983 | Raley et al. .................. 521/31 |
| 4,525,182 A | * | 6/1985 | Rising et al. .................. 96/6 |
| 5,989,318 A | * | 11/1999 | Schroll .................. 96/6 |
| 6,746,514 B2 | * | 6/2004 | Bedingfield et al. .......... 95/46 |
| 6,942,718 B1 | * | 9/2005 | Schmidt .................. 95/46 |
| 7,238,224 B2 | * | 7/2007 | Kent .................. 95/46 |
| 7,449,051 B2 | * | 11/2008 | Olsen .................. 96/6 |
| 2002/0192525 A1 | * | 12/2002 | Neutzler .................. 429/34 |

OTHER PUBLICATIONS

Office Action issued in corresponding Chinese Patent Application No. 2006100771940 dated Feb. 15, 2008.

* cited by examiner

*Primary Examiner*—Jason M Greene
(74) *Attorney, Agent, or Firm*—Stein McEwen, LLP

(57) ABSTRACT

A liquid-gas separator for a direct liquid feed fuel cell includes a tube having an opening portion at a sidewall thereof; liquid extracting members that selectively transmit the liquid in the tube and located at both ends of the tube; a gas extracting membrane that selectively transmits the gas and covers the opening portion; an inlet that guides the liquid and the gas into the tube; chambers that surround an outer side of the liquid extracting member; and outlets that guide the liquid in the chambers to the outside by being connected to the chamber.

22 Claims, 5 Drawing Sheets

LIQUID-GAS SEPARATOR FOR DIRECT LIQUID FEED FUEL CELL

CROSS-REFERENCE TO RELATED APPLICATIONS

This application claims the benefit of Korean Application No. 2005-55115, filed Jun. 24, 2005 in the Korean Intellectual Property Office, the disclosure of which is incorporated herein by reference.

BACKGROUND OF THE INVENTION

1. Field of the Invention

An aspect of the present invention relates to a liquid-gas separator for segregating carbon dioxide and an unreacted liquid fuel discharged from an anode electrode of a direct liquid feed fuel cell.

2. Description of the Related Art

A direct liquid feed fuel cell is an apparatus that generates electricity by electrochemical reactions between an organic fuel, such as methanol or ethanol, and an oxidant, i.e., oxygen. The electricity generated by the direct liquid feed fuel cell has a high specific energy density and a high power density. Also, since liquid fuel, i.e., methanol, is fed directly to the cell, the direct feed fuel cell does not require a peripheral device, such as a fuel reformer, and storing and supplying the liquid fuel are easy.

As depicted in FIG. 1, the direct feed fuel cell has a structure including an anode electrode 2, a cathode electrode 3, and an electrolyte membrane 1 interposed between the two electrodes 2 and 3. The anode electrode 2 includes a diffusion layer 22 for supplying and diffusing fuel, a catalyst layer 21 at which oxidation reaction of the fuel occurs, and an electrode supporting layer 23. The cathode electrode 3 also includes a diffusion layer 32 for supplying and diffusing the fuel, a catalyst layer 31 at which reduction reaction occurs, and an electrode supporting layer 33. The catalyst for generating the electrode reaction is formed of a precious metal, such as platinum, having superior catalytic characteristics at low temperature. Alternately, to avoid catalyst poisoning by CO, which is a by-product of the electrode reaction, a transition metal alloy catalyst comprising ruthenium, rhodium, osmium, or nickel can be used. The electrode supporting layers 23 and 33 can be made of waterproofed carbon paper or waterproofed carbon fiber for easily supplying fuel and discharging reaction products. The electrolyte membrane 1 is a hydrogen ion exchange membrane having ion conductivity and containing moisture, and is formed of a polymer membrane having a thickness of 50~200 μm.

An electrode reaction of a direct methanol fuel cell (DMFC), which is a type of direct liquid feed fuel cell, includes an anode reaction where fuel is oxidized and a cathode reaction where hydrogen and oxygen are reduced, as described below.

$CH_3OH+H_2O \rightarrow CO_2+6H^++6e^-$ (Anode reaction) [Reaction 1]

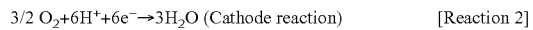
$3/2\ O_2+6H^++6e^- \rightarrow 3H_2O$ (Cathode reaction) [Reaction 2]

$CH_3OH+3/2\ O_2 \rightarrow 2H_2O+CO_2$ (Overall reaction) [Reaction 3]

Carbon dioxide, hydrogen ions, and electrons are produced at the anode electrode 2 where the fuel is oxidized (reaction 1). The hydrogen ions migrate to the cathode electrode 3 through a hydrogen ion exchange membrane 1. Water is produced by the reduction reaction between hydrogen ions, electrons transferred from an external circuit, and oxygen at the cathode electrode 3 (reaction 2). Accordingly, water and carbon dioxide are produced as the result of an overall electrochemical reaction (reaction 3) between methanol and oxygen. Two moles of water are produced when one mole of methanol reacts with oxygen.

The liquid fuel used in the fuel cell may not be pure methanol, but may be a mixture with water produced in the system or already stored in the fuel cell system. When a fuel of high concentration is used, the performance of the fuel cell is greatly reduced due to crossover of the fuel through the electrolyte membrane (hydrogen ion exchange membrane). Therefore, methanol diluted to a low concentration, such as 0.5 to 2 M (2 to 8 volume %), is generally used.

FIGS. 2A and 2B are cross-sectional views of a liquid-gas separator used for a fuel cell. The orientation of the liquid-gas separator 10 used for a mobile fuel cell is not fixed at one orientation. At a normal orientation (refer to FIG. 2A), unreacted fuel and carbon dioxide enter the liquid-gas separator 10 through an inlet 11. Carbon dioxide is exhausted into the air through a hole 12 formed on a ceiling of the liquid-gas separator body, and the unreacted fuel is recovered to the fuel cell through an outlet 13 formed on a lower part of the liquid-gas separator body.

However, at a reversed orientation (refer to FIG. 2B) of the liquid-gas separator 10, the outlets 12 and 13 of the unreacted fuel and carbon dioxide are changed. Accordingly, the carbon dioxide may pass into the anode electrode, and the unreacted fuel can be discharged to the outside.

SUMMARY OF THE INVENTION

An aspect of the present invention provides a liquid-gas separator that performs liquid-gas separation regardless of its orientation, and a direct liquid feed fuel cell having the liquid-gas separator.

According to an aspect of the present invention, there is provided a liquid-gas separator of a direct liquid feed fuel cell, which receives a gas and a liquid from the direct liquid feed fuel cell and separates the liquid and the gas, the liquid-gas separator including a tube having an opening portion at a sidewall thereof; liquid extracting members that selectively transmit the liquid in the tube to an outside area and are located at both ends of the tube; a gas extracting membrane that selectively extracts the gas and covers the opening portion; an inlet that guides the liquid and the gas into the tube; chambers that surround an outer side of the liquid extracting member; and outlets that guide the liquid in the chambers to the outside by being connected to the chamber.

The liquid extracting member may be a first member having pores of 100 μm or less.

The liquid extracting member may further include a second member having pores of a greater diameter than the first member, the second member located on the first member opposite to the liquid in the tube with respect to the first member.

The second member may line the chamber.

The gas extracting membrane may be formed of polytetrafluoro ethylene (PTFE).

The gas extracting membrane may be formed by pressing the PTFE with a porous reinforcing member.

The tube may further include a liquid absorbing member inside the tube.

The liquid absorbing member may be beads having a predetermined diameter.

The liquid absorbing member may have a specific gravity of 0.95 or less.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
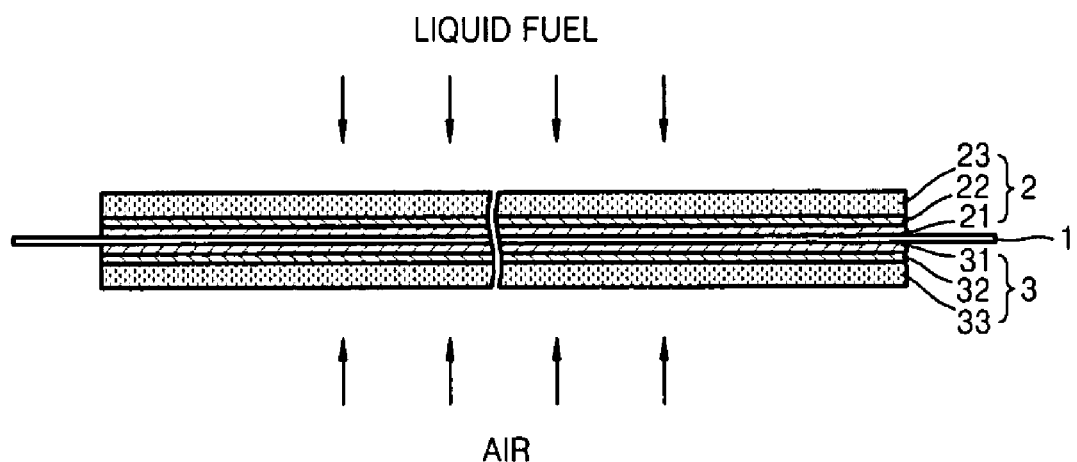
FIG. 1 is a cross-sectional view of the basic configuration of a direct liquid feed fuel cell.
Figure 2A:
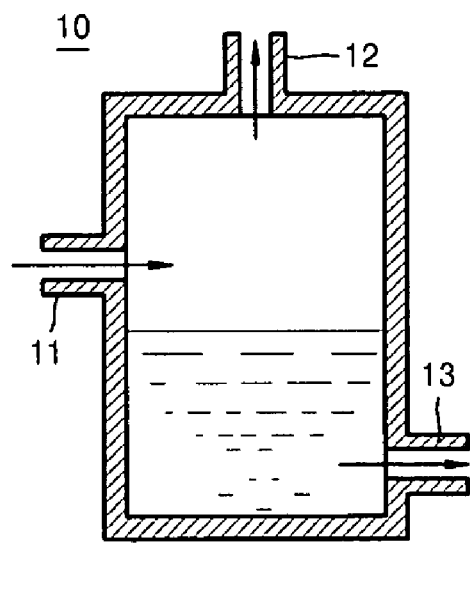
FIGS. 2A and 2B are cross-sectional views of a liquid-gas separator used for a fuel cell.
Figure 2B:
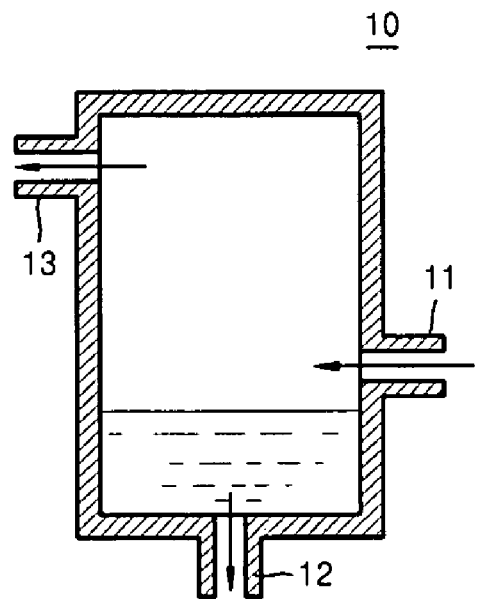

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
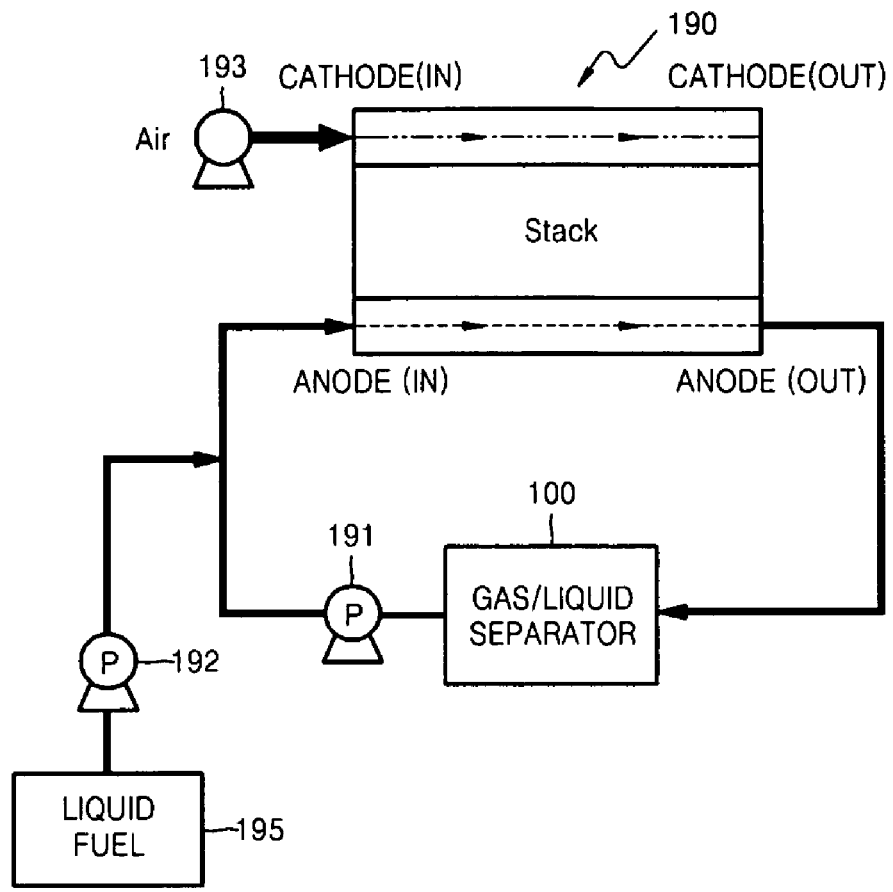
FIG. 3 is a schematic drawing of the conceptual configuration of a direct liquid feed fuel cell system having a liquid-gas separator according to an embodiment of the present invention.

FIG. 3 is a schematic drawing of the conceptual configuration of a direct liquid feed fuel cell system having a liquid-gas separator according to an embodiment of the present invention.

Referring to FIG. 3, a direct liquid feed fuel cell system includes a direct liquid feed fuel cell, such as a fuel cell stack 190, a liquid-gas separator 100 that exhausts carbon dioxide into the atmosphere and delivers liquid fuel to an anode using a water pump 191 after receiving diluted unreacted liquid fuel and carbon dioxide which is a product from an electrochemical reaction, a water pump 192 that conveys the diluted liquid fuel (methanol) from a fuel tank 195 to the fuel cell stack 190, and a blower 193 that supplies air to the fuel cell stack 190. Water produced at a cathode electrode is discharged or can be circulated to the liquid-gas separator 100 or the fuel tank 195.

Figure 4:
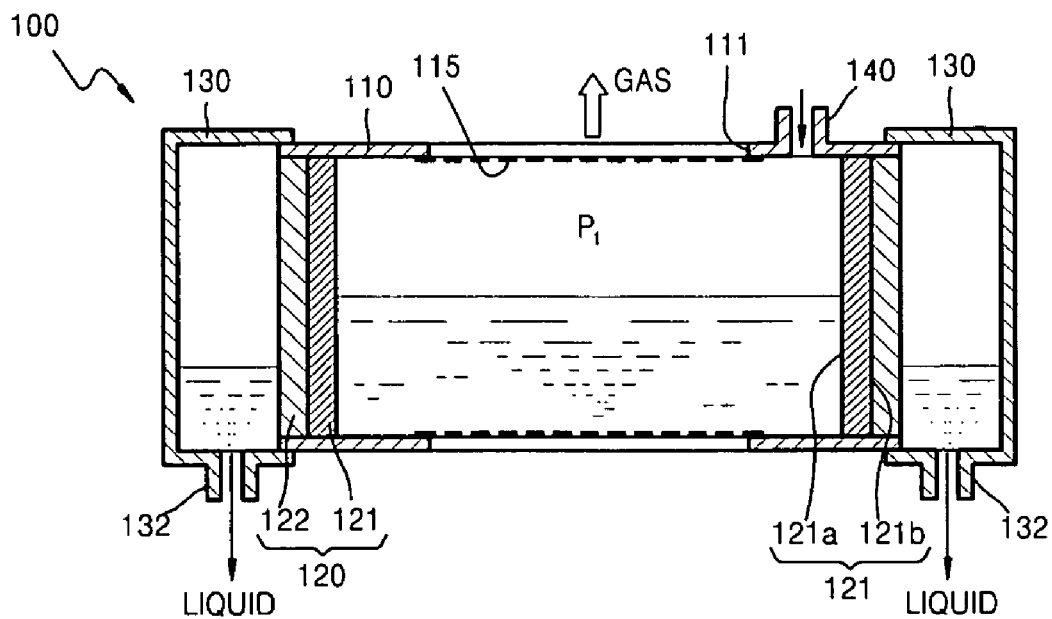
FIG. 4 is a cross-sectional view of a liquid-gas separator according to an embodiment of the present invention.

FIG. 4 is a cross-sectional view of a liquid-gas separator 100 according to an embodiment of the present invention.

Referring to FIG. 4, liquid extracting members 120, which are separated a predetermined distance and face each other, are formed at ends of a cylindrical tube 110 having a predetermined diameter. An opening portion 111 is formed at a side wall of the cylindrical tube 110, and a gas extracting membrane 115 is formed to cover the opening portion 111. Chambers 130 are formed on the liquid extracting member 120. Each chamber 130 includes an outlet 132, and unreacted fuel in the chamber 130 is conveyed to the anode electrode of fuel cell stack 190 (at this time, the water pump P can be used) through the outlet 132. An inlet 140 that guides the liquid fuel and carbon dioxide into the cylindrical tube 110 from the anode electrode of the fuel cell stack 190 is formed at an outer circumference of the cylindrical tube 110.

Each of the liquid extracting members 120 includes a first member 121 that contacts a material in the cylindrical tube 110 and a second member 122 that faces the chamber 130. The first member 121 can be a foam member having pores of 100 μm or less, and the second member 122 can be a foam member having pores of 100 μm to 1 mm. The first member 121 selectively discharges the liquid fuel in the cylindrical tube 110 to the chamber 130, and the second member 122 facilitates the discharge action of the first member 121. The second member 122 may be installed to line the chamber 130.

The gas extracting membrane 115 can be formed of polytetrafluoro ethylene (PTFE) which is porous and has a hydrophobic property. The gas extracting membrane 115 may be shaped by pressing the PTFE with a porous reinforcing member (not shown) such as a porous cloth. The gas extracting membrane 115 blocks the outflow of the liquid fuel from the cylindrical tube 110 and allows the exhaustion of gas, i.e., carbon dioxide.

The first member 121 of the liquid extracting members 120 includes a first surface 121$a$ which faces the liquid fuel in the cylindrical tube 110 and a second surface 121$b$ that contacts the second member 122. When the liquid fuel in the tube 110 contacts a part of the liquid extracting member 120, the liquid extracting member 120 gets soaked due to its hydrophilic properties under normal operating condition of the fuel cell system. Therefore, the gas in the tube 110 which is facing the first surface 121$a$ must overcome the first capillary force of the first surface 121$a$ of the first member 121 to infiltrate into the first member 121 through the first surface 121$a$, and must overcome the second capillary force of the of the second surface 121$b$ to infiltrate into the second member 122. When the gas pressure P1 of a gas entering through the inlet 140 is greater than the second capillary force, the liquid fuel infiltrates into the second member 122 through the first member 121 since the first capillary force is not generated at a region of the first surface 121$a$ that contacts the liquid fuel. The second member 122 easily discharges the liquid fuel received from the first membrane 121 into the chamber 130. The gas in the cylindrical tube 110 is exhausted to the atmosphere through the gas extracting membranes 115 by the internal pressure of the cylindrical tube 110.

The chamber 130 can be formed of metal, plastic, or flexible vinyl.

The liquid-gas separator 100 can reliably separate the gas and liquid fuel when the liquid-gas separator 100 rotates around an axis that connects the two liquid extracting members 120.

Figure 5:
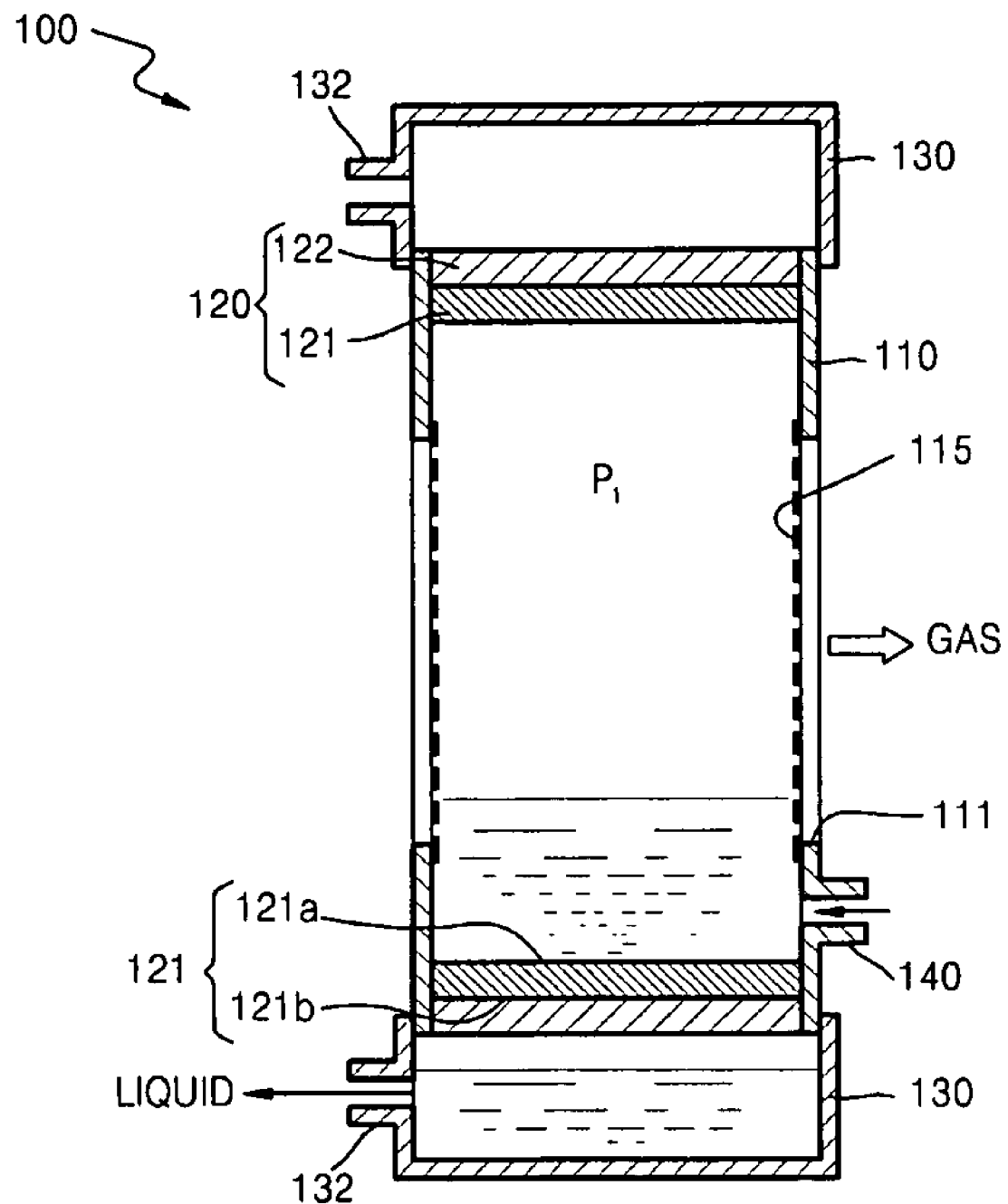
FIG. 5 is a cross-sectional view of the liquid-gas separator of FIG. 4 when liquid extraction units are positioned up and down.

FIG. 5 is a cross-sectional view of the liquid-gas separator of FIG. 4 when liquid extraction members are positioned up and down. The liquid fuel moves to the lower chamber 130 through the first member 121 and the second member 122, and the gas is exhausted to the atmosphere through the gas extracting membranes 115.

As described above, the liquid-gas separator 100 according to an embodiment of the present invention performs separation of the liquid-gas regardless of the position of the liquid-gas separator 100.

Figure 6:
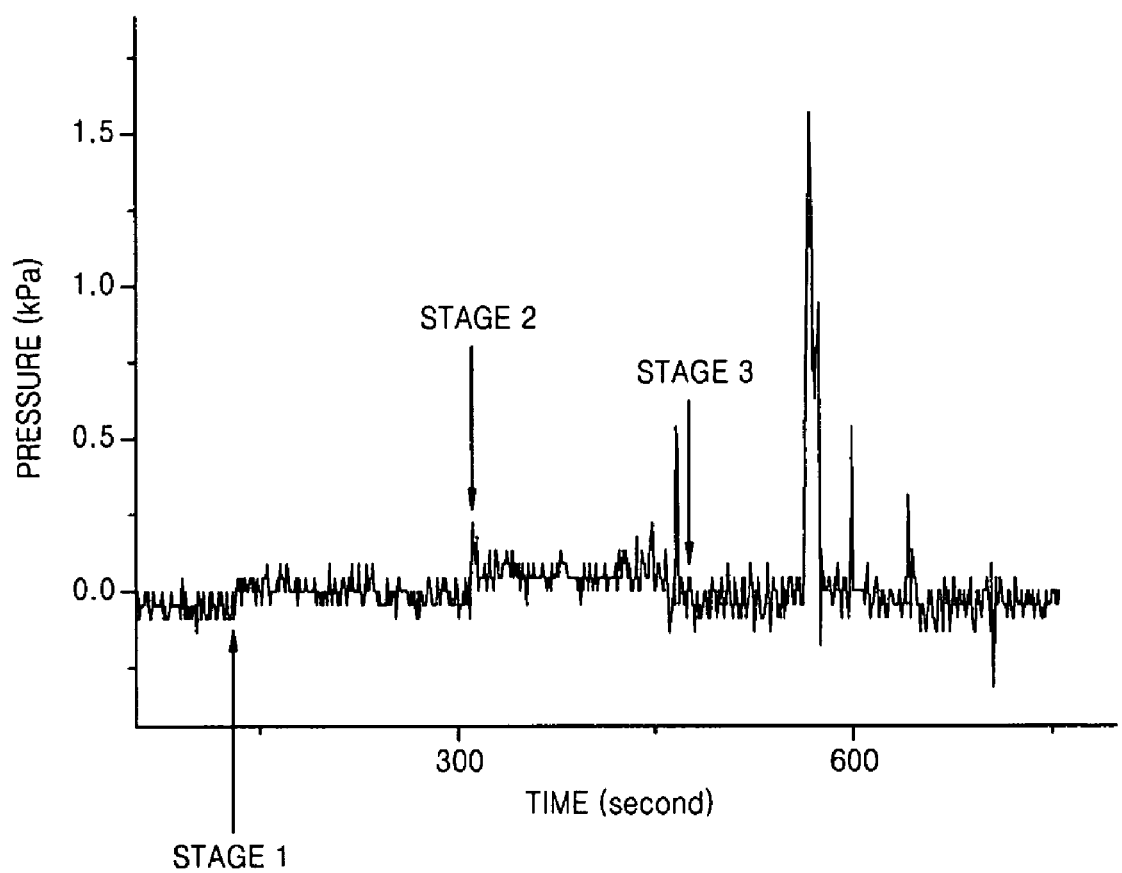
FIG. 6 is a graph showing the variation of internal pressure of a cylindrical tube of a liquid-gas separator according to an embodiment of the present invention.

FIG. 6 is a graph showing a variation of internal pressure of a cylindrical tube of a liquid-gas separator according to an embodiment of the present invention.

To measure the internal pressure of the cylindrical tube 110, the inlet 140 of the cylindrical tube 110 is connected to an outlet of the water pump P, and an inlet of the water pump is connected to the outlet 132 of the cylindrical tube. As air is injected into the cylindrical tube 110 at a flow rate of 150 ml/min (stage 1), water is circulated at a flow rate of 40 ml/min (stage 2). That is, the liquid fuel from the water pump P and the gas are injected into the cylindrical tube 110, and the liquid from the outlet 132 of the chamber 130 is circulated back to the water pump P. Next, the liquid-gas separator 100 is positioned as depicted in FIG. 5 (stage 3). Referring to FIG. 6, the pressure in the cylindrical tube 110 is maintained constant, and accordingly, stable liquid-gas separation is observed.

Figure 7:
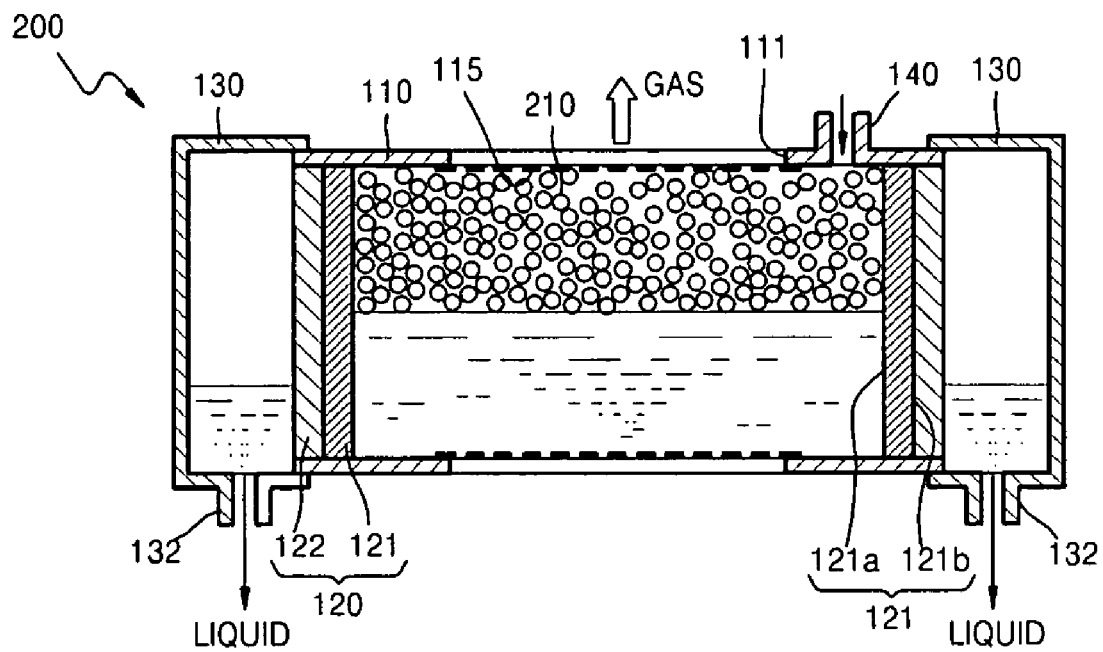
FIG. 7 is a cross-sectional view of a liquid-gas separator according to another embodiment of the present invention.

FIG. 7 is a cross-sectional view of a liquid-gas separator 200 according to another embodiment of the present invention. Reference numerals common to FIG. 7 and FIG. 4 denote like elements, and thus the descriptions thereof will be omitted.

Referring to FIG. 7, liquid extracting members 120, which are separated a predetermined distance and face each other, are formed at ends of a cylindrical tube 110 having a predetermined diameter. An opening portion 111 is formed at a sidewall of the cylindrical tube 110, and a gas extracting membrane 115 is formed to cover the opening portion 111. Chambers 130 are formed on the liquid extracting member 120. Each chamber 130 includes an outlet 132, and unreacted fuel in the chamber 130 is conveyed to the anode electrode of fuel cell stack 190 in FIG. 3 through the outlet 132. An inlet 140 that guides the liquid fuel and carbon dioxide into the cylindrical tube 110 from the anode electrode of the fuel cell stack 190 is formed at an outer circumference of the cylindrical tube 110.

The cylindrical tube 110 is filled with a liquid absorbing member that absorbs supersaturated liquid, such as a plurality of beads 210. The beads 210 reduce the discharging of liquid from the cylindrical tube 110 by adsorbing the vapor state of water or the liquid fuel that passes through the gas extracting membranes 115 on their surfaces. The beads 210 preferably float in the cylindrical tube 110 by being formed of plastic having a lower specific gravity than the liquid entering the cylindrical tube 110 to contact the gas. Most of the liquid entering the cylindrical tube 110 is water, and the specific gravity of the liquid is close to 1 since the specific gravity of methanol is 0.79. Most plastics can be used for forming the beads 210 since they have a specific gravity lower than water. The beads 210 are preferably formed of a plastic having a specific gravity of 0.95 or less.

A plastic having a honeycomb structure (not shown) can be used as the liquid absorbing member.

The operation of the liquid-gas separator 200 according to another embodiment of the present invention is substantially the same as the liquid-gas separator 100 of FIG. 4, except for the fact that the beads 210 reduce the amount of the vapor state of water or liquid fuel that passes through the gas extracting membranes 115.

As described above, the liquid-gas separator according to an aspect of the present invention separates liquid and gas regardless of the position of the liquid-gas separator, when the liquid-gas separator is applied to a mobile direct liquid feed fuel cell in which the position of the liquid-gas separator can change at any time. Accordingly, a direct liquid feed fuel cell having the liquid-gas separator performs the liquid-gas separation function regardless of the position of the liquid-gas separator.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid-gas separator which receives liquid and gas from a direct liquid feed fuel cell and separates the liquid and gas, the liquid-gas separator comprising:
    a tube having an opening portion at a sidewall thereof;
    liquid extracting members that selectively transmit the liquid in the tube to outer sides of the liquid extracting members, the liquid extracting members being located at both ends of the tube;
    a gas extracting membrane that selectively transmits the gas and covers the opening portion of the tube;
    an inlet that guides the liquid and the gas into the tube;
    chambers that surround the outer sides of the liquid extracting members; and
    outlets connected to the chambers and that guide the liquid in the chambers to the outside.

2. The liquid-gas separator of claim 1, wherein each of the liquid extracting members includes a first member having pores of 100 μm or less.

3. The liquid-gas separator of claim 2, wherein each of the liquid extracting members further comprises a second member having pores of a greater diameter than the first member, the second member located adjacent to the first member and opposite to the liquid in the tube with respect to the first member.

4. The liquid-gas separator of claim 3, wherein the second members line the chambers.

5. The liquid-gas separator of claim 1, wherein the gas extracting membrane is formed of polytetrafluoro ethylene (PTFE).

6. The liquid-gas separator of claim 5, wherein the gas extracting membrane is formed by pressing the PTFE with a porous reinforcing member.

7. The liquid-gas separator of claim 1, further comprising a liquid absorbing member inside the tube.

8. The liquid-gas separator of claim 7, wherein the liquid absorbing member is beads having a predetermined diameter.

9. The liquid-gas separator of claim 8, wherein the liquid absorbing member has a specific gravity of 0.95 or less.

10. A liquid-gas separator for use in a liquid feed fuel cell, the liquid-gas separator comprising:
    a cylindrical tube having an opening portion and an inlet portion, the inlet portion allowing liquid and gases to enter the cylindrical tube;
    a gas extracting membrane covering the opening portion of the cylindrical tube and selectively extracting the gases from inside the cylindrical tube to an outside of the cylindrical tube;
    liquid extracting members disposed at ends of the cylindrical tube and selectively extracting the liquid from the cylindrical tube to chambers surrounding outer sides of the liquid extracting members,
    wherein the chambers include outlets that guide the liquid inside the chambers to the outside of the chambers.

11. The liquid-gas separator of claim 10, wherein the chambers are formed of metal, plastic, or flexible vinyl.

12. The liquid-gas separator of claim 10, wherein the cylindrical tube is filled with liquid absorbing members that absorb supersaturated liquid.

13. The liquid-gas separator of claim 12, wherein the liquid absorbing members are a plurality of beads.

14. The liquid-gas separator of claim 13, wherein the beads reduce the discharging of liquid from the cylindrical tube by absorbing a vapor state of water or a liquid fuel that passes through the gas extracting membrane.

15. The liquid-gas separator of claim 13, wherein the beads float in the cylindrical tube.

16. The liquid-gas separator of claim 13, wherein the beads are formed of plastic and have a lower specific gravity than the liquid entering the cylindrical tube.

17. The liquid-gas separator of claim 13, wherein the beads have a specific gravity of 0.95 or less.

18. The liquid-gas separator of claim 12, wherein the liquid absorbing member is a plastic having a honeycomb structure.

19. The liquid-gas separator of claim 10, wherein each of the liquid extracting members includes first members having pores of 100 μm or less.

20. The liquid-gas separator of claim 19, wherein each of the liquid extracting members further comprises second members having pores of a greater diameter than the first members, the second members located adjacent to the first members.

21. A liquid-gas separator for use in a liquid feed fuel cell, the liquid-gas separator comprising:
    a cylindrical tube having an opening portion covered by a gas extracting membrane and an inlet portion allowing liquid and gases to enter the cylindrical tube;
    liquid extracting members disposed at ends of the cylindrical tube and selectively extracting the liquid from the cylindrical tube; and
    chambers adjacent to the liquid extracting members receiving the extracted liquid from the cylindrical tube.

22. The liquid-gas separator of claim 21, wherein the liquid-gas separator performs separation of the liquid-gas regardless of the position of the liquid-gas separator.

\* \* \* \* \*